United States Patent
Ben-Yaakov et al.

(10) Patent No.: US 10,014,823 B2
(45) Date of Patent: Jul. 3, 2018

(54) HIGH EFFICIENCY RESONANT SWITCHED CAPACITOR CONVERTER WITH CONTINUOUS CONVERSION RATIO

(71) Applicant: BEN-GURION UNIVERSITY OF THE NEGEV RESEARCH & DEVELOPMENT AUTHORITY, Beer Sheva (IL)

(72) Inventors: Shmuel Ben-Yaakov, Beer Sheva (IL); Alon Cervera, Beer Sheva (IL); Alon Blumenfeld, Ashkelon (IL); Mor Mordechai Peretz, Lehavim (IL)

(73) Assignee: BEN-GURION UNIVERSITY OF THE NEGEV RESEARCH & DEVELOPMENT AUTHORITY, Beer Sheva (IL)

( * ) Notice: Subject to any disclaimer, the term of this patent is extended or adjusted under 35 U.S.C. 154(b) by 536 days.

(21) Appl. No.: 14/419,652

(22) PCT Filed: Aug. 4, 2013

(86) PCT No.: PCT/IL2013/050661
§ 371 (c)(1),
(2) Date: Feb. 4, 2015

(87) PCT Pub. No.: WO2014/024184
PCT Pub. Date: Feb. 13, 2014

(65) Prior Publication Data
US 2015/0188405 A1 Jul. 2, 2015

Related U.S. Application Data

(60) Provisional application No. 61/679,738, filed on Aug. 5, 2012.

(51) Int. Cl.
*H02M 1/08* (2006.01)
*H02M 3/07* (2006.01)
(Continued)

(52) U.S. Cl.
CPC ............... *H02S 40/30* (2014.12); *H02J 1/00* (2013.01); *H02M 1/083* (2013.01); *H02M 3/07* (2013.01);
(Continued)

(58) Field of Classification Search
USPC .......................................................... 307/52
See application file for complete search history.

(56) References Cited

U.S. PATENT DOCUMENTS 5,870,295 A * 2/1999 Watanabe .............. G11C 5/145
307/110
2001/0033501 A1* 10/2001 Nebrigic ............... H02J 7/0065
363/49
(Continued)

FOREIGN PATENT DOCUMENTS

EP 2544344 A1 3/2009

OTHER PUBLICATIONS

International Search Report dated Dec. 8, 2013 for PCT/IL2013/050661.
Written Opinion dated Dec. 8, 2013 for PCT/IL2013/050661.

*Primary Examiner* — Rexford Barnie
*Assistant Examiner* — Xuan Ly
(74) *Attorney, Agent, or Firm* — Kinney & Lange, P.A.

(57) ABSTRACT

A power converter, which comprises a resonant Switched Capacitor Converter (SCC) that consists of an input connected to an input voltage source, from which power is delivered to a load; a resonant tank circuit formed by a capacitor connected in series with an inductor and defining a resonant cycle; a first switch connected in series between a first contact of the input voltage source and a first contact of the resonant tank circuit; a second switch connected in series between the first contact of the resonant tank circuit and a first contact of the load; a conducting path connecting between a second contact of the input voltage source, a second contact of the resonant tank circuit and a second contact of the load and a third switch connected in parallel to the resonant tank circuit. The converter is adapted to charge the resonant tank circuit by controlling the first switch to start conducting at a first zero crossing point and allow current to flow from the input voltage source to the tank circuit during a first portion of the cycle; discharge the resonant tank circuit into the load by controlling the first switch to stop conducting and the second switch to start conducting, at a second zero crossing point to thereby allow current to flow from the tank circuit to the load during a second portion of the cycle, and reverse the voltage polarity (Continued)

on the capacitor by controlling the second switch to stop conducting and the third switch to start conducting at a third zero crossing point during the last portion of the cycle.

27 Claims, 9 Drawing Sheets

(51) Int. Cl.
  *H02S 40/30* (2014.01)
  *H02J 1/00* (2006.01)
  *H02M 1/00* (2006.01)
(52) U.S. Cl.
  CPC ...... *H02M 2001/0058* (2013.01); *Y02E 10/56* (2013.01); *Y10T 307/549* (2015.04)

(56) References Cited

U.S. PATENT DOCUMENTS

| | | |
|---|---|---|
| 2005/0030768 A1* | 2/2005 | MacMillan ............ H02M 3/158 363/25 |
| 2007/0035265 A1 | 2/2007 | Balog, Jr. et al. |
| 2007/0230228 A1* | 10/2007 | Mao ...................... H02M 3/156 363/89 |
| 2008/0100272 A1 | 5/2008 | Yoshio |
| 2009/0059630 A1 | 3/2009 | Wlliams |
| 2010/0225278 A1 | 9/2010 | Reefman et al. |

\* cited by examiner

HIGH EFFICIENCY RESONANT SWITCHED CAPACITOR CONVERTER WITH CONTINUOUS CONVERSION RATIO

FIELD OF INVENTION

The invention is in the field of switched power converters. More particularly, the invention relates to a high efficiency bidirectional resonant Switched Capacitor Converter (SCC) with continuous conversion ratio, and features gyrator characteristics.

BACKGROUND OF THE INVENTION

Switched power converters are usually used in power supplies and are implemented in two typical forms. The first implementation is a Switched-Inductor Converter (SIC), in which the component that accumulates the energy during conversion is an inductor. SICs are widely used in high power applications since they have a wide operating range with high efficiency and hence, the efficiency is not dramatically affected by the conversion ratio. However, SICs have relatively large dimensions and they cannot be used in systems where size reduction is critical.

The second implementation is a Switched Capacitor Converter (SCC), in which the component that accumulates the energy during conversion is a capacitor. SCCs are widely used in lower power applications where size reduction is critical, since they are relatively compact. However, SCCs have high efficiency only in a single operating point or at several operating points (which correspond to discrete conversion ratios), depending on their design.

Another problem with conventional SCCs is the fact that they have limited capabilities for voltage regulation due to the tight relationship between the voltage gain and the converter efficiency. In such SCC converters, the efficiency is tied to the ratio between the output voltage $V_o$, and the target voltage $V_T$ (which is the SCC's output voltage with no load), which stems from the rigid proportionality between the input and output charges.

$$\eta = \frac{V_0}{V_T} \quad \text{(Eq. 1)}$$

Regulation can be obtained either by varying the SCC parameters, i.e. by adding losses, or inserting a post regulation stage, in order to match the required conversion ratio.

A more advanced approach for voltage regulation by SCC is to generate multiple conversion ratios and therefore increase the effective operation range. However, the system efficiency would remain of a discrete nature. The multiple conversion ratios approach has shown advancement in the utilization of SCC, in particular as a high efficiency first stage converter that may be followed by a reduced size local regulator.

Resonant SCC operation with Zero Current Switching (ZCS) has been used to reduce the switching losses, while allowing higher switching frequency operation and thereby, potentially reducing the total volume of the converter. However, even with ZCS implementation, high efficiency is still obtained only for discrete conversion ratios.

Another problem in existing soft-switched SCCs, which should create an output voltage that is different from the target voltage, is the fact that the charge-balance of the flying capacitor(s) after a charge/discharge cycle is not zero, due to the residual charge left in the flying capacitor(s). This residual charge prevents the system from converging to the desired output voltage by increasing or decreasing the output voltage, in order to satisfy the charge-balance of all the capacitors. The result will be a drift of the output voltage from the desired operation point back toward $V_T$.

Figure 1:
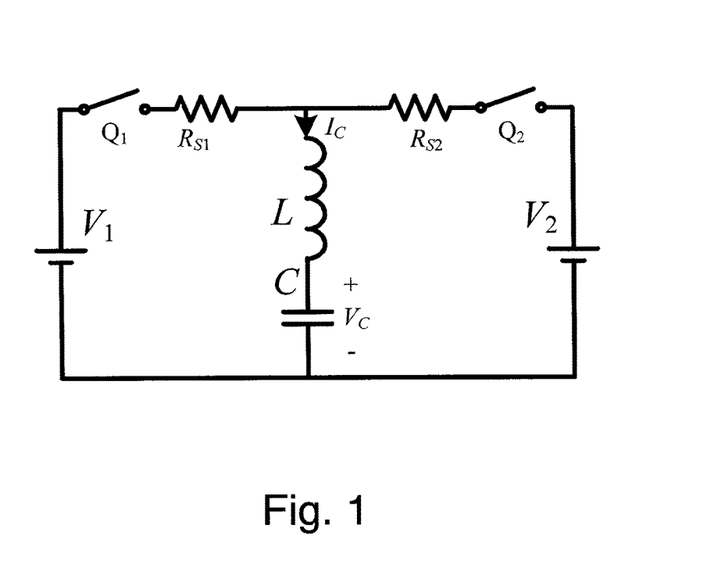
FIG. 1 (prior art) schematically shows a conventional 1:1 resonant switched capacitor converter.

FIG. 1 (prior art) schematically shows a conventional 1:1 resonant switched capacitor converter. The resistors $Rs_1$ and $Rs_2$ represent loop series resistances, where $V_1$ and $V_2$ are the input and output voltages, respectively.

Figure 2:
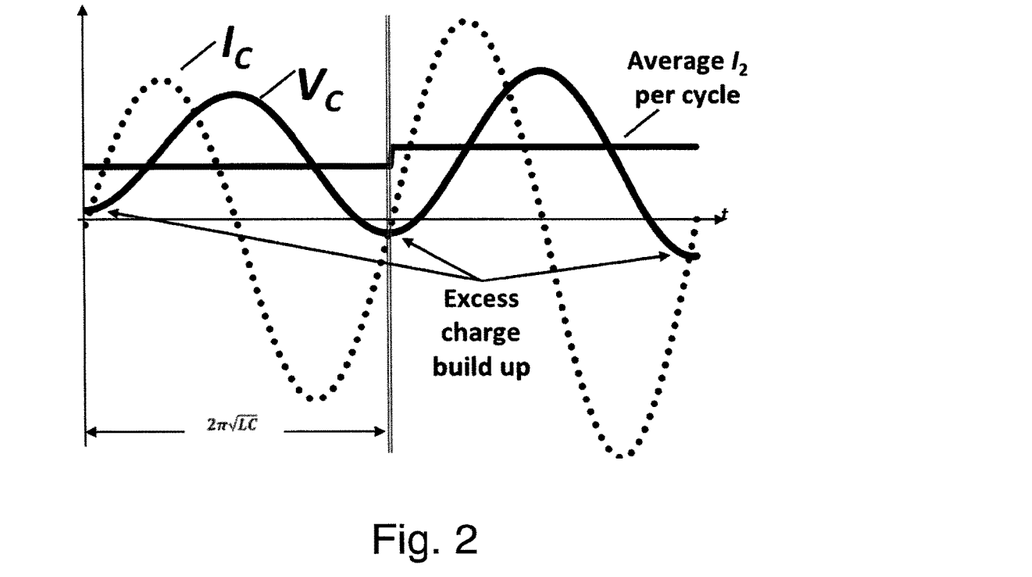
FIG. 2 (prior art) schematically shows typical waveforms of the flying capacitor in the SCC described in FIG. 1.

FIG. 2 (prior art) schematically shows typical waveforms of the flying capacitor C in the SCC described in FIG. 1 (prior art) for a case that $V_1 \neq V_2$. The dotted line shows the capacitor's current, Ic, while the solid line shows the capacitor's voltage Vc. The dashed line shows the average output current Io which corresponds to each switching cycle. The current waveform shows that although ZCS is obtained, the charge received from the source is not equal to the charge delivered to the output. This entails an unbalanced capacitor voltage (i.e., the starting point is not equal to the end point in each cycle) that continues to rise in every cycle, thereby leading to a runaway effect, which must be compensated.

"Zero voltage switching double-wing multilevel modular switched-capacitor DC-DC converter with voltage regulation," (C. Dong, L. Xi, Y. Xianhao, F. Z. Peng, IEEE APEC, 2013, No., pp. 2029-2036 discloses a method to solve the problem of residual charge of the capacitor and allows regulation by introducing series losses. However, this approach reduces the overall efficiency of the converter.

"Analysis of Step-down Resonant Switched Capacitor Converter with Sneak Circuit State" (Qiu Dongyuan and Zhang Bo, 37th IEEE PESC 2006), pp. 1-5 discloses a topology (named "Sneak Circuit State") with an additional switching stage to internally circulate the charge, to emphasize an inherent feature of the original resonant SCC configuration.

"A resonant switched-capacitor converter for voltage balancing of series-connected capacitors" (K. Sano and H. Fujita, 2009 International Conference on Power Elect. and Drive Systems, pp. 683-688) discloses circuitry to circulate the charge. In this case, the operation of the converter was set above the resonant frequency, thereby exhibiting inductive behavior. This allows reversing the inductor current using phase shift control, which also regulates the power flow direction. However, according to this solution, soft switching cannot be guaranteed for the entire operation range.

"Unified Analysis of Switched-Resonator Converters" (M. Jabbari, IEEE Trans. on Power Elect. 2011, vol. 26, no. 5) discloses a solution which combines resonant and linear operation to completely discharge the energy of the LC tank in every switching cycle. However, the direction of the power flow is still dictated either by the system configuration or by the source of the higher potential.

All the conventional methods still have at least some of the disadvantages of reducing the overall efficiency of the converter, soft switching that cannot be guaranteed for the entire operation range, limited direction of the power flow, relatively large size or dependency of the target voltage from the conversion ratio.

It is therefore an object of the present invention to provide a high efficiency resonant Switched Capacitor Converter (SCC) which overcomes the problems of prior art converters and has a wide operating rage, similar to SICs.

It is another object of the present invention to provide a high efficiency resonant Switched Capacitor Converter (SCC), which allows eliminating the dependency between efficiency and conversion ratio.

It is a further object of the present invention to provide a resonant Switched Capacitor Converter (SCC), with high efficiency over a wide conversion ratio.

It is still another object of the present invention to provide a high efficiency resonant Switched Capacitor Converter (SCC), which allows obtaining improved flying capacitor's charge-balance.

Other objects and advantages of the invention will become apparent as the description proceeds.

SUMMARY OF THE INVENTION

The present invention is directed to method for increasing the efficiency of a resonant Switched Capacitor Converter (SCC) by eliminating the dependency between efficiency and conversion ratio, which comprises the following steps:
- a) providing a resonant Switched Capacitor Converter (SCC), having an input and an output to be loaded by a load, the resonant SCC consisting of:
  - a.1) an input connected to an input voltage source, from which power is delivered to the load;
  - a.2) a resonant tank circuit formed by a capacitor connected in series with an inductor and defining a resonant cycle;
  - a.3) a first switch connected in series between a first contact of the input voltage source and a first contact of the resonant tank circuit;
  - a.4) a second switch connected in series between the first contact of the resonant tank circuit and a first contact of the load;
  - a.5) a conducting path connecting between a second contact of the input voltage source, a second contact of the resonant tank circuit and a second contact of the load;
- b) connecting a third switch connected in parallel to the resonant tank circuit, for introducing an alternative resonant path to the tank circuit;
- c) during a first portion of the cycle, charging the resonant tank circuit by controlling the first switch to start conducting at a first zero crossing point and allow current to flow from the input voltage source to the tank circuit;
- d) during a second portion of the cycle, following the first portion, discharging the resonant tank circuit into the load by controlling the first switch to stop conducting and the second switch to start conducting, at a second zero crossing point to thereby allow current to flow from the tank circuit to the load;
- e) during the last portion of the cycle, following the second portion, reversing the voltage polarity on the capacitor by controlling the second switch to stop conducting and the third switch to start conducting at a third zero crossing point, to thereby balance the residual charge of the capacitor and restore its voltage to return to its value at the beginning of, the cycle; and
- f) repeating steps c) to e) above for each subsequent cycle.

Whenever the power flow should be delivered in the opposite direction from the output of the SCC to a load connected to the input of the SCC, controlling the switches to operate according to the following steps:
- a) during a first portion of the cycle, charging the resonant tank circuit by controlling the second switch to start conducting at a first zero crossing point and allow current to flow from the output to the tank circuit;
- b) during the second portion of the cycle, following the first portion, discharging the resonant tank circuit into the input by controlling the first switch to conduct and the second switch to stop conducting, at a second zero crossing point to thereby allow current to flow from the tank circuit to the load;
- c) during the last portion of the cycle, following the second portion, reversing the polarity of the charge on the capacitor by controlling the first switch to stop conducting and the third switch to start conducting at a second zero crossing point; and
- d) repeating steps a) to c) above for each subsequent cycle.

The switches may be bidirectional switches that operate in a synchronous or complementary action. The power conversion may be a step-up and/or step-down conversion and also may be voltage dependent current-sourcing conversion, capable of accommodating input to output voltage gain being larger and smaller than unity.

Preferably, the duration of each switching state is ½ the resonant period and comprises of three half resonant states.

Whenever the energy accumulating component is the inductor, the third switch may be controlled to remain short-circuited at the end of the cycle.

The voltage at the output of the converter may be regulated by performing one of the following:
- a) introducing time delay between switching states;
- b) using Pulse Density Modulation (PDM) by applying delay between consecutive sequences; and
- c) creating packets using ON-OFF burst mode control.

Energy from the input may be transferred to the output in a controlled manner, in portions, where the excess charge that is not transferred to the output is recycled in the converter.

The converter may operate in a gyrator-mode power transfer, in which the dependency of the average terminal currents from the average terminal voltages follows a gyrator relationship.

The resonant SCC may operate as a current sourcing DC-DC converter, whenever one of the terminals of the converter is loaded by a load resistor connected in parallel to a capacitor, such that the magnitude of the output voltage depends on the load resistor.

By controlling the switches to be either conducting, non-conducting, or replaced by a diode, the converter may operate in one of the following unidirectional or bidirectional conversion modes:
- a) Step up-down
- b) Step up
- c) Step down
- d) Doubler step up-down
- e) Doubler step up
- f) Doubler step down
- g) Divider step up-down
- h) Divider step up
- i) Divider step down The resonant SCC may operate in a bridge configuration and function as a balancer/equalizer of energy cells or photovoltaic arrays. If the resonant SCC operates in bridge configuration, the switches may be replaced by conventional MOSFETs, IGBTs or any other conventional switch.

The present invention is also directed to an apparatus for increasing the efficiency of a resonant Switched Capacitor Converter (SCC) by eliminating the dependency between efficiency and conversion ratio, which comprises:

a) a resonant Switched Capacitor Converter (SCC), having an input and an output to be loaded by a load, the resonant SCC consisting of:
  a.1) an input connected to an input voltage source, from which power is delivered to the load;
  a.2) a resonant tank circuit formed by a capacitor connected in series with an inductor and defining a resonant cycle;
  a.3) a first switch connected in series between a first contact of the input voltage source and a first contact of the resonant tank circuit;
  a.4) a second switch connected in series between the first contact of the resonant tank circuit and a first contact of the load;
  a.5) a conducting path connecting between a second contact of the input voltage source, a second contact of the resonant tank circuit and a second contact of the load;
b) a third switch connected in parallel to the resonant tank circuit, for introducing an alternative resonant path to the tank circuit,
  wherein the apparatus is adapted to:
c) during a first portion of the cycle, charge the resonant tank circuit by controlling the first switch to start conducting at a first zero crossing point and allow current to flow from the input voltage source to the tank circuit;
d) during a second portion of the cycle, following the first portion, discharge the resonant tank circuit into the load by controlling the first switch to stop conducting and the second switch to start conducting, at a second zero crossing point to thereby allow current to flow from the tank circuit to the load;
e) during the last portion of the cycle, following the second portion, reverse the voltage polarity on the capacitor by controlling the second switch to stop conducting and the third switch to start conducting at a third zero crossing point, to thereby balance the residual charge of the capacitor and restore its voltage to return to its value at the beginning of the cycle; and
f) repeat steps c) to e) above for each subsequent cycle.

The apparatus may further comprise a control circuit, which whenever the power flow should be delivered in the opposite direction from the output of the SCC to a load connected to the input of the SCC, controls the switches to perform the following steps:
  a) during a first portion of the cycle, charge the resonant tank circuit by controlling the second switch to start conducting at a first zero crossing point and allow current to flow from the output to the tank circuit;
  b) during the second portion of the cycle, following the first portion, discharge the resonant tank circuit into the input by controlling the first switch to conduct and the second switch to stop conducting, at a second zero crossing point to thereby allow current to flow from the tank circuit to the load;
  c) during the last portion of the cycle, following the second portion, reverse the polarity of the charge on the capacitor by controlling the first switch to stop conducting and the third switch to start conducting at a second zero crossing point; and
  d) repeat steps a) to c) above for each subsequent cycle.

The switches may be bidirectional switches that operate in a synchronous or complementary action.

The apparatus may further comprise circuitry for regulating the voltage at the output of the converter by performing one of the following:
  a) introducing time delay between switching states;
  b) using Pulse Density Modulation (PDM) by applying delay between consecutive sequences; and
  c) creating packets using ON-OFF burst mode control.

DETAILED DESCRIPTION OF THE EMBODIMENTS OF THE INVENTION

The present invention describes a resonant switched capacitor converter with high efficiency over a wide and continuous conversion ratio, in which an additional, lossless, charge/discharge path is introduced, in order to satisfy the capacitor charge-balance.

The efficiency of the topology depends primarily on the conduction losses and is decoupled, to a large extent, from the voltage conversion ratio. This is an advantage over the classical SCCs in which the efficiency is related to the conversion ratio. The operation principle applies three zero current switching (ZCS) states to charge, discharge and balance the remaining charge of the flying capacitor. This results in a Gyrator-behaved voltage-dependent current source with a wide voltage conversion ratio (smaller and/or greater than unity) and bidirectional power flow. This leads to an optimal result, where the current that is output by the current source is injected into the load, and actually adjusts the voltage at the output, while keeping it independent of the conversion ratio. Actually, with the new topology, dependency is formed between the input voltage $V_1$ and the output current (rather than the output voltage). In this way, any desired conversion ratio may be obtained (i.e., the conversion ratio becomes continuous), while maintaining high efficiency. The analytical expressions for conversion ratio and expected efficiency are provided and validated by simulation and experiments. The experimental verification of the converter demonstrates peak efficiency of 96%, and above 90% efficiency over a wide range of voltage gains and loading conditions. In addition, the system was found to be highly efficient at the extreme cases of both light and heavy loads.

Figure 3A:
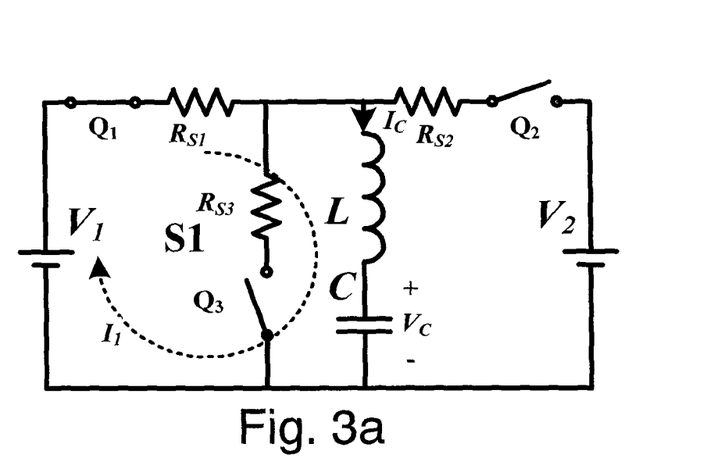
FIG. 3 schematically shows the introduced resonant switched capacitor converter configuration and operation principle in different states, according to an embodiment of the invention.
Figure 3B:
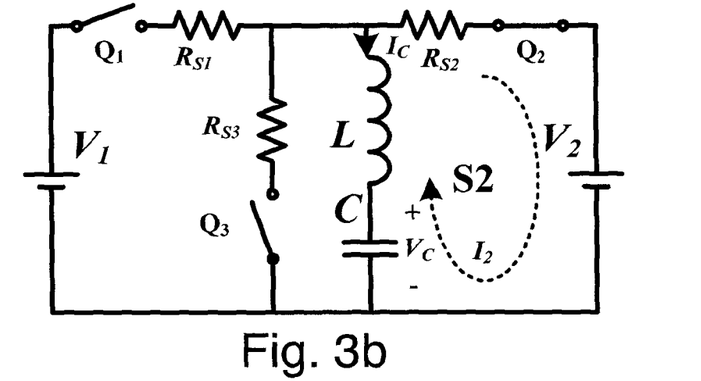
Figure 3C:
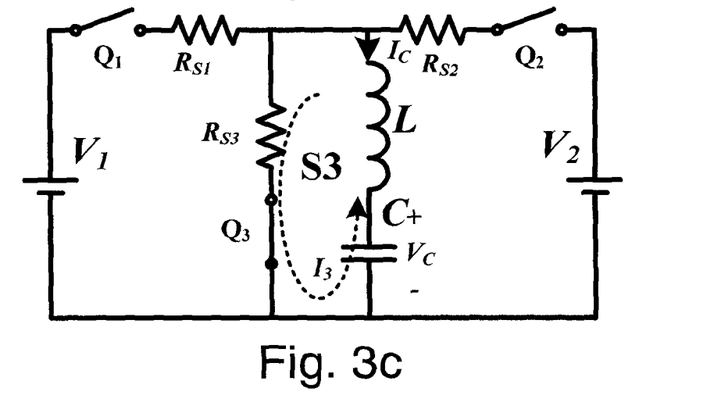

FIG. 3 illustrates a schematic diagram of the new resonant SCC that disengages the efficiency of the system from the voltage gain, according to the present invention. Due to this disengagement, the converter efficiency may be very high and depends primarily on the conduction losses. The converter operates as a voltage-dependent current source, maintains soft switching for the entire operation range, and exhibits bidirectional power flow with wide voltage gains. FIGS. 3a, 3b and 3c illustrate the switching schemes during charge, discharge and balance states, respectively.

The proposed converter presented in FIG. 3, is a modification of a conventional soft-switched SCC, which includes two switches Q1 and Q2 and a resonant tank consisting of a capacitor C and an inductor L. The additional switch $Q_3$ is added to introduce an alternative resonant path $I_3$ of the current to balance the residual charge of the flying capacitor C, i.e. it restores the flying capacitor's voltage to its original state by reversing its polarity. The mechanism of polarity reversal (which causes charge balancing) causes the disengagement of the efficiency dependency from the input/output voltage. Appropriately controlling the sequence of the switches enables to control the power flow direction, and hence, bidirectional step up/down operation. In this novel implementation, by balancing the residual charge of the flying capacitor C, the excess energy is reused in the circuit and therefore, the efficiency is increased. The inductor L participates in the energy reuse process by appropriately transferring the charges as desired. Therefore, the values of L and C are appropriately selected to obtain the amount of charges to be transferred from $V_1$ to $V_2$ or vice-versa.

Principle of Operation

The topology illustrated in FIG. 3 requires four-quadrant (bidirectional) switches ($Q_1$, $Q_2$, and $Q_3$) that operate in a synchronous/complementary action. This is required to support bi-directional and non-inverting step up/down operation in a single configuration. However, for more specific cases such as unidirectional power flow and/or specific conversion type (up or down), the amount of switches and the configuration complexity can be significantly reduced.

Figure 4:
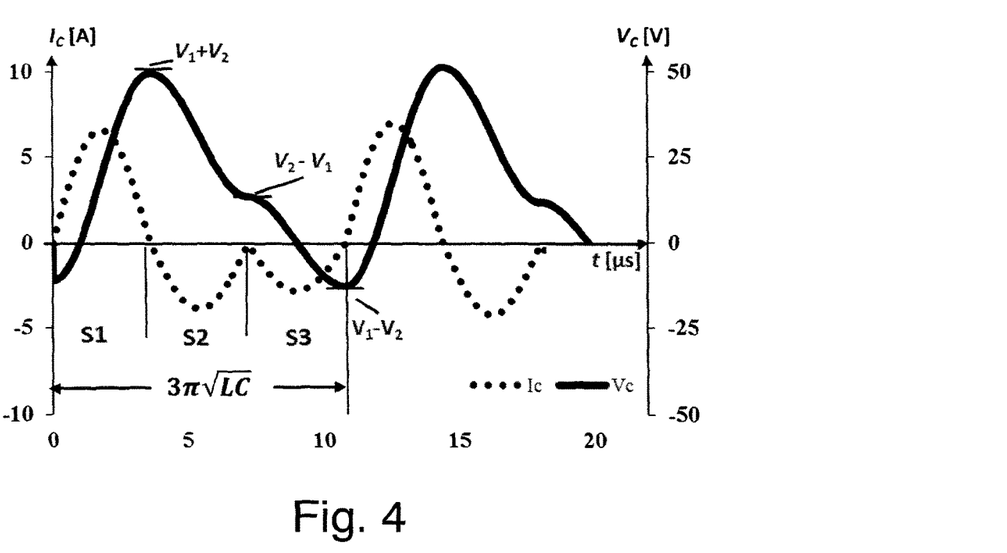
FIG. 4 schematically shows typical simulated waveforms of the flying capacitor voltage and current in the circuit of FIG. 3.

FIG. 4 illustrates the operation of the converter shown in FIG. 3, for one steady-state charge/discharge/balance cycle, while showing the flying capacitor's voltage $V_C$ and the resonant tank current $I_C$, for a case of a non-unity step-up conversion. The Circuit parameters were: Vin=20V, Vo=31V, Rs=0.15Ω, L=5.2 μH, C=0.25 μF.

By turning switch $Q_1$ on, a charging state (S1) is commenced, during which the flying capacitor C resonantly charges from the input $V_1$. At zero current, $Q_1$ is turned off and $Q_2$ is turned on, thereby initiating a discharging state S2. At this point, the flying capacitor C resonantly discharges onto the output capacitor (not shown). Since the input voltage $V_1$ and the output voltage, $V_2$ have different values, only a portion of the charge is delivered to the output. This results in a capacitor's voltage (Vc=$V_2$-$V_1$) that is different than the capacitor's voltage (Vc=$V_1$-$V_2$) at the starting point of S1. The amount of voltage difference (neglecting parasitics) equals to twice the residual voltage of the flying capacitor and is given by ($\Delta$Vc=2$V_2$-2$V_1$). By turning $Q_3$ on, a charge balancing state S3 is initiated, during which the resonant tank is short-circuited. This creates the required charge-balance and reverses the polarity of the flying capacitor's voltage, such that the voltage at the end of state S3 equals to the voltage at the beginning of state S1 and thereby, the unwanted runaway effect is compensated.

The addition of a third, charge balancing state S3 to the switching sequence transforms the resonant SCC into a voltage dependent current-sourcing converter that (neglecting losses) is capable of accommodating any input to output voltage gain (larger and smaller than unity). Under steady-state conditions, the order of charge/discharge/balance sequence does not affect the operation of the converter for either step up or down conversion. The order of the sequence will govern the power flow direction, i.e. from $V_1$ to $V_2$ or from $V_2$ to $V_1$. To deliver power from $V_1$ to $V_2$ the switching sequence will be S1→S2→S3. This switching sequence causes charging from $V_1$, followed by discharging on $V_2$, followed by reversing the flying capacitor polarity. In the case of power to be delivered from $V_2$ to $V_1$, the sequence will be changed to S2→S1→S3. The duration of each switching state is ½ the resonant period and consists of three half resonant states. Hence, the switches are turned on and off at ZCS. This way, energy from the input is transferred to the output in a controlled manner, in portions, where the excess charge that is not transferred to the output is recycled in the converter's circuit.

According to another embodiment, the energy accumulating component may be the inductor L (rather than the capacitor C). This mode of operation exploits the duality between a charged capacitor that remains in open circuit and a charged inductor that remains short-circuited.

Voltage regulation may be applied by introducing time delay between switching states, using Pulse Density Modulation (PDM—a form of modulation according to which, specific amplitude values of an analog signal are encoded into pulses with relative density that corresponds to the amplitude of the analog signal) by applying delay between consecutive sequences, or by creating packets using ON-OFF burst mode control. The resistors $Rs_1$, $Rs_2$ and $Rs_3$ in FIG. 3 represent the parasitic resistances in each loop and are assumed to be negligibly small in the analysis for the current and voltage conversion ratios.

Gyrator Mode Power Transfer

In each switching state the L-C tank is connected to a voltage potential of either $V_1$, $V_2$ or 0. Assuming a high quality factor (Q>>1) of the resonant tank, the resonant current $I_C$ and the flying capacitor voltage $V_C$ are approximately sinusoidal, hence:

$$V_C(t) \approx V_i - (V_i - V_C(0))\cos\left(\frac{t}{\sqrt{LC}}\right) \quad \text{(Eq. 2a)}$$

$$I_C(t) \approx \frac{V_i - V_C(0)}{\sqrt{L/C}}\sin\left(\frac{t}{\sqrt{LC}}\right) \quad \text{(Eq. 2b)}$$

where C is the value of the flying capacitor, and L is the series inductance. t=0 represents the start of each switching state, and $V_i$ represents the DC voltage, either $V_1$, $V_2$, or 0 V.

Following the principle of operation described above and assuming steady-state operation with transition between switching states at zero current without additional delay, and by using Eq. 2a, a set of equations (Eq. 3) can be formed for the voltages at the end of the charge, discharge and balance states:

$$\begin{cases} V_{C,1} \approx V_1 + (V_1 - V_{C,3}) = 2V_1 - V_{C,3} \\ V_{C,2} \approx V_2 + (V_2 - V_{C,1}) = 2V_2 - V_{C,1}, \\ V_{C,3} \approx 0 + (0 - V_{C,2}) = -V_{C,2} \end{cases} \quad \text{(Eq. 3)}$$

where $V_{C,1}$ to $V_{C,3}$ represent the capacitor's voltage $V_C$ at the end of stages S1 to S3, respectively. After some manipulations, Eq. 3 can be rewritten as:

$$\begin{cases} V_{C,1} = V_1 + V_2 \\ V_{C,2} = V_2 - V_1 \\ V_{C,3} = V_1 - V_2 \end{cases} \quad \text{(Eq. 4)}$$

Substituting Eq. 2b into Eq. 4 yields the states' peak resonant currents ($I_{pk,S1}$, $I_{pk,S2}$, $I_{pk,S3}$):

$$\begin{cases} I_{pk,S1} = V_2/Z \\ I_{pk,S2} = V_1/Z \quad ; Z = \sqrt{\frac{L}{C}}. \\ I_{pk,S3} = (V_1 - V_2)/Z \end{cases} \quad \text{(Eq. 5)}$$

Assuming identical resonant characteristics for all states, that is, a ⅓ of the operation cycle for each state, the average input and output currents ($I_1$, $I_2$) can be obtained, and a Gyrator relationship between the currents ($I_1$, $I_2$) and voltages ($V_1$, $V_2$) is formed by:

$$\begin{bmatrix} V_1 \\ I_1 \end{bmatrix} = \begin{bmatrix} 0 & g^{-1} \\ g & 0 \end{bmatrix} \begin{bmatrix} V_2 \\ I_2 \end{bmatrix}; g \equiv g_n \triangleq \frac{2}{3\pi Z} \quad \text{(Eq. 6)}$$

where $g_n$ is referred as the natural gyration gain.

It implies from (Eq. 6) that for a synchronously running converter, the dependency of the average terminal currents ($I_1$, $I_2$) on the average terminal voltages ($V_1$, $V_2$) follows a gyrator relationship with a natural gyration gain of $g_n$. The expression is generic and holds for the case of power flow from $V_1$ to $V_2$ as well for power flow from $V_2$ to $V_1$. However, as mentioned above, the direction of power flow is governed by the switching stage sequence, and reverses for the case of S2→S1→S3. It should be further noted that due to the gyration action, the converter behaves as a voltage-dependent current-source, and there is virtually no restriction on the relative magnitudes of $V_1$ and $V_2$. That is, $V_2$ can be equal, smaller, or greater than $V_1$.

For a case that one of the terminals is loaded by a resistive load $R_L$ paralleled with a filtering capacitor $C_L$, the resonant SCC operates as a current sourcing DC-DC converter and the magnitude of the output voltage $V_2$ depends on the load resistor as would be expected from a Gyrator-behaved circuit:

$$V_2 = gR_L V_1 \quad \text{(Eq. 7)}$$

The voltage gain, A, will be:

$$A = \frac{V_2}{V_1} = gR_L. \quad \text{(Eq. 8)}$$

The natural operating frequency, $f_n$, is composed of three half-resonant sections, that are assumed identical. Therefore, $f_n$ can be expressed as:

$$f_n = \frac{1}{3\pi\sqrt{LC}}. \quad \text{(Eq. 9)}$$

Voltage Regulation

The basic operation mechanism that follows a charge, discharge and balance states creates a rigid gyration relationship as defined by Eq. 6. In the case that voltage regulation is desired, g should be controlled. By introducing time delay between cycles (i.e., effectively changing the operating frequency) g is made controllable and the gyration ratio g and operating frequency can be re-defined as:

$$g = Gg_n = \frac{2G}{3\pi Z}, \quad \text{(Eq. 10a)}$$

$$f_s = Gf_n = \frac{G}{3\pi\sqrt{LC}}, \quad \text{(Eq. 10b)}$$

where $G \in (0,1]$ is defined as the regulation factor. In this mode of operation, the output current will be determined by the input voltage and g.

Power Losses

Assuming zero current switching, losses of the converter are primarily due to resistive elements in the conduction paths of each sub-circuit. For a full operation cycle at frequency $f_s$, the current of each sub-circuit is composed of one half-sinusoidal pulse followed by zero current for the time duration of the delay plus the conduction time of the other two states. Assuming that the output current is constant and neglecting the voltage ripple, the relationship between the RMS currents and the average output current $I_2$ will be:

$$\begin{cases} I_{RMS,S1} = \sqrt{\frac{G}{6}} \frac{R_L}{Z} I_2 \\ I_{RMS,S2} = \frac{3\pi}{2} \frac{1}{\sqrt{6G}} I_2 \\ I_{RMS,S3} = \left| \frac{3\pi}{2} \frac{1}{\sqrt{6G}} - \sqrt{\frac{G}{6}} \frac{R_L}{Z} \right| I_2 \end{cases} \quad \text{(Eq. 11)}$$

The total power dissipation can be calculated by summation of the losses of the three sub-circuits. Given an identical parasitic resistance $R_s$ for the three sub-circuits, the total dissipated power $P_{loss}$ can be expressed as:

$$P_{loss} = I_2^2 \left( \frac{3\pi^2}{4G} + \frac{R_L^2 G}{3Z^2} - \frac{\pi R_L}{2Z} \right) R_L. \quad \text{(Eq. 12)}$$

By substituting Eq. 6, Eq. 8 and Eq. 10a into Eq. 12 and after some manipulations, the equivalent resistance of the converter, $R_e$ as a function of the load, voltage ratio and the circuit parameters is found to be:

$$R_e = R_L \frac{\pi}{2} \frac{R_s}{Z} (A + A^{-1} - 1), \quad \text{(Eq. 13)}$$

The efficiency of the converter can now be estimated by:

$$\eta = \frac{R_L}{R_L + R_e} = \frac{1}{1 + \frac{\pi R_s}{2Z}(A + A^{-1} - 1)}. \quad \text{(Eq. 14)}$$

Figure 5:
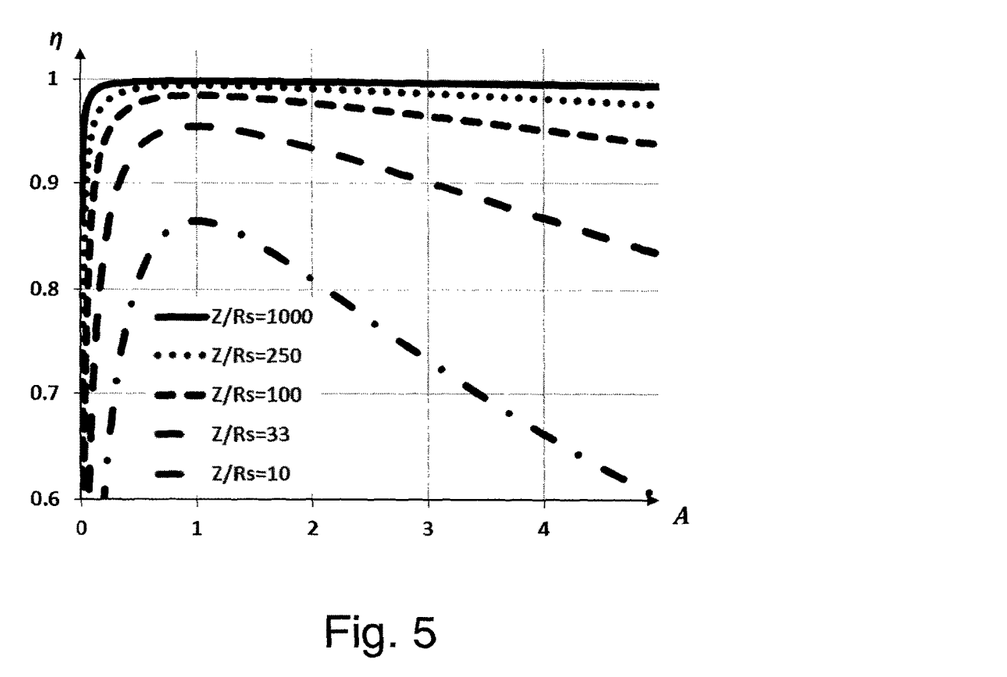
FIG. 5 schematically shows theoretical efficiency curves as a function of the voltage gain.

FIG. 5 shows theoretical efficiency curves that were obtained from Eq. 14 of the expected efficiency as a function of the voltage gain A with normalized loop resistance as a parameter, for various ratios of $Q=Z/R_s$. As can be observed, maximum efficiency is obtained at unity gain (A=1), and it is a function of ratio of the resistance to the resonant network characteristics. To draw FIG. 5, Z can be considered constant since it is determined by the natural gyration gain $g_n$. Eq. 14 also implies that the efficiency is independent of the regulation factor G, resulting in a constant efficiency in voltage regulation mode, when the current is controlled.

Eq. 14 and FIG. 5 provide an insight into the operation of the introduced converter and contributing factors of the converter's efficiency. Ideally, assuming negligibly small parasitic resistances, the efficiency of the converter would be 100% for any conversion ratio. This unique feature which hitherto belongs only for Switched-Inductor Converters (SICs), is now made available to resonant SCCs, as well.

Output Voltage Ripple

The operation of the converter presented in this work resembles Discontinuous Conduction Mode Pulse Frequency Modulation (DCM-PFM) operation of conventional switch-mode converters, which are predominant as voltage regulators. In this context, estimation of the output voltage ripple is essential for sizing considerations of the output filter. By following the same design rules applied to switch-mode regulators (i.e., assuming constant output current), the current of the output capacitor ($C_L$) is similar in shape to the current of the discharge state, but without the average DC offset.

Figure 6:
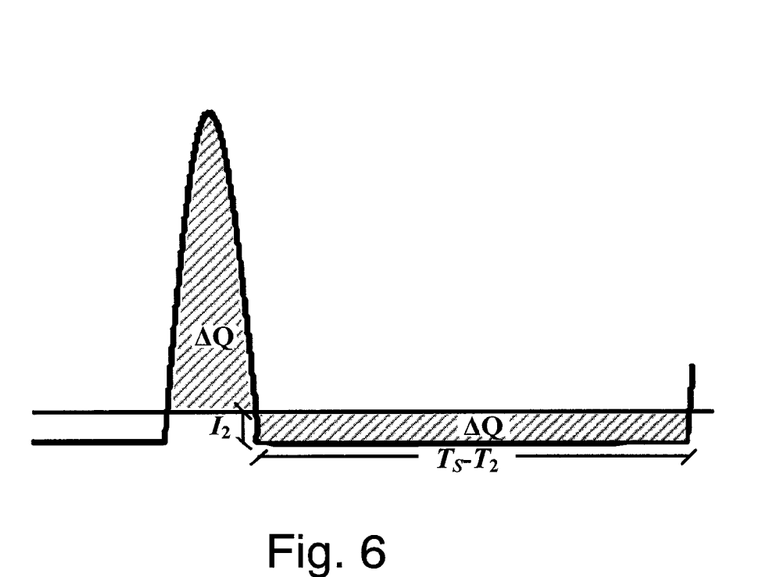
FIG. 6 schematically shows the current on the output capacitor for one cycle.

FIG. 6 schematically shows the output capacitor's current $I_{CL}$, for one cycle. The confined area is symmetrical above and below zero, and represents the charge processed by $C_L$ at each cycle. By approximating the negative part of the current to a rectangle shape, the per-cycle charge transfer, $\Delta Q_{C_L}$, can be expressed as.

$$\Delta Q_{C_L} \approx I_2 \left( \frac{1}{f_s} - \frac{1}{3f_n} \right). \quad \text{(Eq. 15)}$$

Substituting Eq. 7, Eq. 8 and Eq. 10 into Eq. 15 yields the expression for the normalized output voltage ripple:

$$\frac{\Delta V_2}{V_2} = \frac{1}{A} \frac{C}{C_L} \left( 1 - \frac{G}{3} \right), \quad \text{(Eq. 16)}$$

where $\Delta V_2$ is the amplitude of the output AC ripple. The output voltage ripple, as obtained by Eq. 16 is inverse linearly dependent on $C_L$ and A. Furthermore, when voltage regulation is employed by varying G, the ripple is expected to deviate by about 30% for the entire operation range of $G \in (0,1]$.

Topology Derivatives

The converter of FIG. 3 may be extended to operate in naturally doubling and dividing configurations (i.e. shifting the peak efficiency points to A=2 or A=0.5, respectively).

Figure 7:
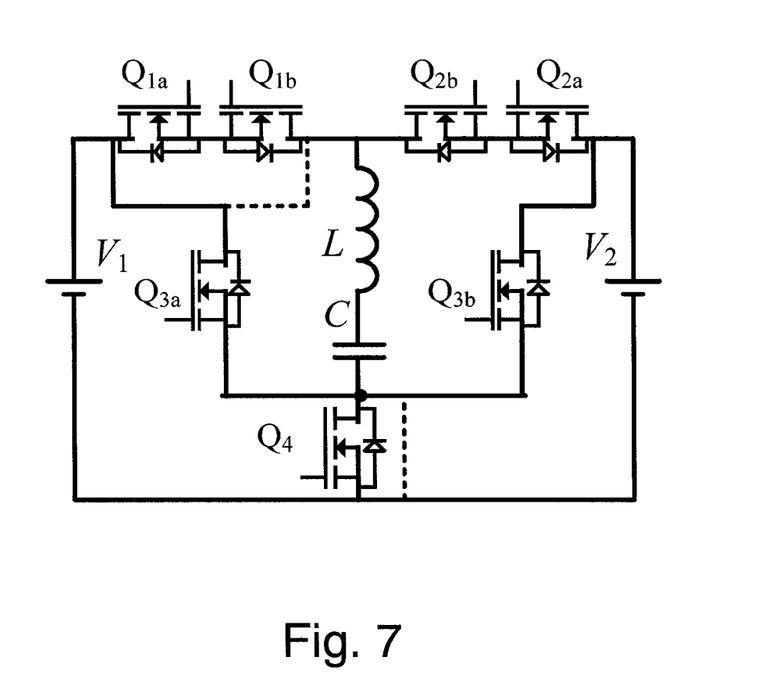
FIG. 7 schematically shows a gyrator-type converter in a generalized configuration, with optimized efficiency at different voltage gains.

FIG. 7 shows a gyrator-type converter in a generalized topology, with optimized efficiency at voltage gains of A={2,1,0.5}. The dashed lines represent alternative routes optimized for a 1:1 configuration. The generalized topology is capable of operating bidirectionally in all gains, with capability to shift the peak efficiency points.

Figure 8:
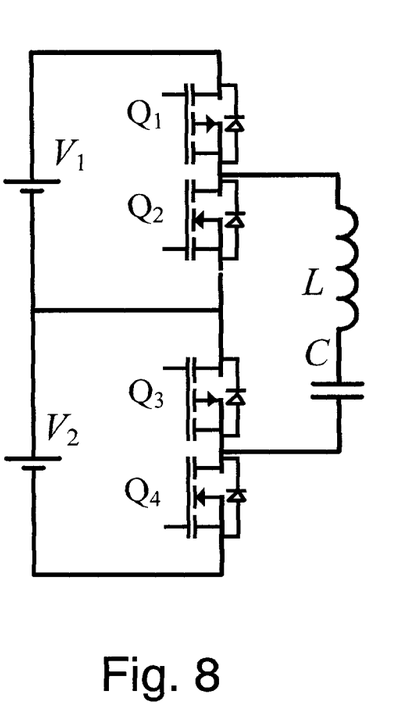
FIG. 8 schematically shows a gyrator-type converter realized in full bridge configuration.

Table I summarizes the possible switch realizations for 7 different unidirectional conversion modes, describing which switches can be either bypassed (S—Shorted), disconnected (O—Open), or replaced by a diode (D). Another attractive option that has voltage inversion properties may be also implemented as a bridge configuration. FIG. 8 schematically shows a gyrator converter which is realized in full bridge configuration (Converter B), with optimized efficiency at voltage gain of A=−1. Possible state-of-the-art applications for the bridge configuration can be as a balancer/equalizer of energy cells, or photovoltaic arrays. It was found that for the bridge configuration, the four-quadrant switches can be replaced by conventional switches, while retaining the converter characteristics.

It should be noted that for configurations that are implemented with two-quadrant switches such as the bridge assembly of FIG. 8, the insertion of time delay between states for voltage regulation purposes has to be assigned to the proper state to avoid undesired circulating current. The delay should be located between states such that $V_C$ is at the correct polarity to block the conduction of the switches anti-parallel diodes. Taking for example the bridge configuration of FIG. 8, the proper sequence for this case would be: charge (S1)→delay→discharge (S2)→charge balance (S3). It should be noted that, as analyzed above, the order in which the sequence is applied does not affect the characteristics of the converter.

TABLE I

SWITCH MAPPING FOR UNI-DIRECTIONAL DERIVATIVES[1]

| Converter Function | $Q_{1a}$ | $Q_{1b}$ | $Q_{2a}$ | $Q_{2b}$ | $Q_{3a}$ | $Q_{3b}$ | $Q_4$ |
|---|---|---|---|---|---|---|---|
| Step up-down[2] | 1 | D | 2 | 2 | 3 | O | S |
| Step up[2] | 1 | D | D | S | 3 | O | S |
| Step down[2] | 1 | D | D | 2 | D | O | S |
| Doubler step up-down | S | 3 | D | S | 3 | O | 1 |
| Doubler step down | S | D | D | S | 3 | O | 1 |
| Divider step up-down | 1 | S | S | 2 | O | 3 | 2 |
| Divider step down | 1 | S | S | 2 | O | D | 2 |

[1]Characters in the table represent the following: S—MOSFET is shorted; O—MOSFET is disconnected; D—only a diode is needed; Numbers represent the stages the MOSFETs are active.
[2]Dashed route is preferred, but not mandatory. Mapping was suggested accordingly.

Experimental Results

To demonstrate the operation of the new converter proposed by the present invention, two sets of experimental test-benches were constructed. In the first experiment, converter of type-A that follows the generic topology of FIG. 3 was realized and examined for the fundamental characteristics of the gyrator-behaved converter and efficiency evaluation. In the second experiment, the converter was constructed as the bridge topology of FIG. 8 (type-B) and its performance as voltage regulator was evaluated.

In the type-A topology, the bidirectional switches were realized by two power MOSFETs (such as IRFP3077 of International Rectifier, El Segundo, Calif., U.S.A.) connected back to back. Floating switch drives were implemented by applying isolation transformers driven by a microcontroller (such as dsPIC30F2020 of MICROCHIP, Inc., Lexington, Mass., U.S.A.). The system was tested under open-loop conditions, while the switching frequency and states switching periods were manually adjusted to obtain ZCS.

Figure 9A:
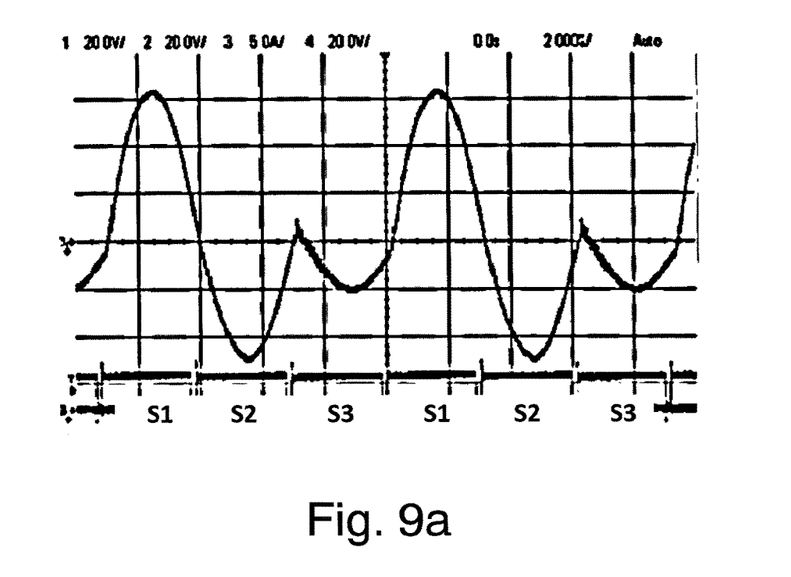
FIG. 9a schematically shows experimental waveforms in a step-up operation mode.

FIG. 9a schematically shows experimental waveforms in a step-up operation mode with ZCS operation.

Figure 9B:
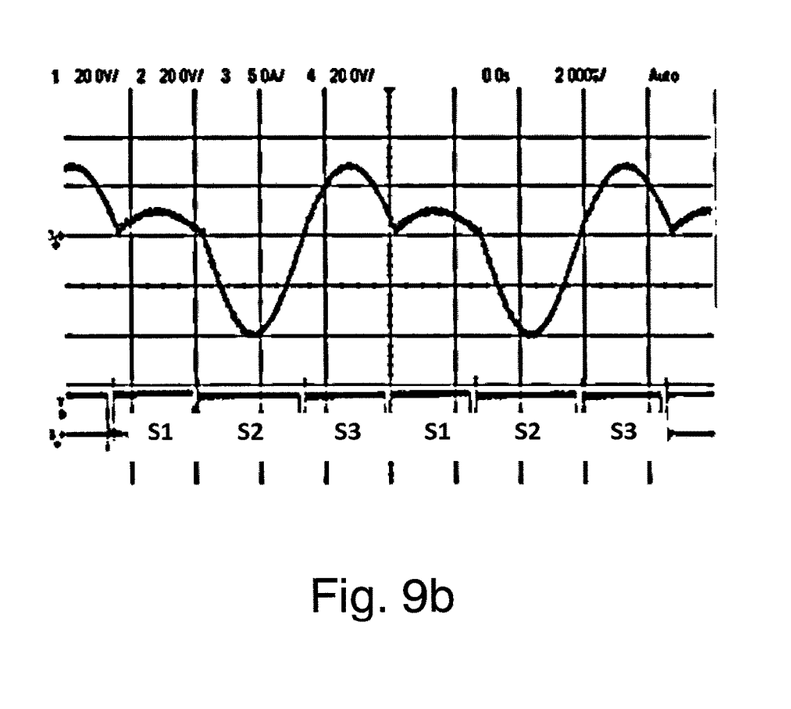
FIG. 9b schematically shows in a step down operation mode

FIG. 9b schematically shows experimental waveforms in a step down operation mode. The upper trace reflects an inductor current of 5A/div. The lower traces reflect S(1,2,3) gate signals. The horizontal scale is 2 μs/div.

Figure 10:
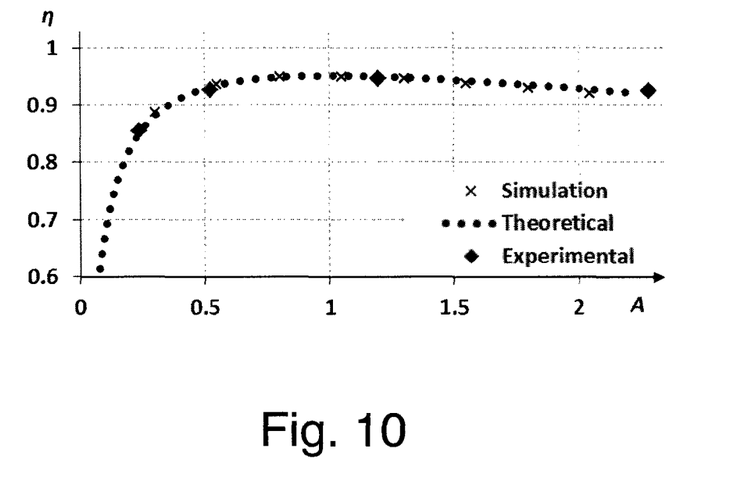
FIG. 10 schematically shows the converter efficiency as a function of voltage gain A.

FIG. 10 schematically shows the converter efficiency as a function of voltage gain A. Validation of the converter's high efficiency along a continuous voltage conversion range (as depicted in FIG. 10) was carried out by varying the input voltage, and load resistance, while keeping the output power constant, around 10 W. As can be observed, the experimental results tightly follow theoretical calculations as well as the results of cycle-by-cycle simulation. The efficiency was measured to be well above 90% for wide operation range. The natural gyration ratio, $g_n$, of the converter as a function of voltage gain was evaluated by varying the input voltage, while the output voltage was kept constant. This was done by varying $R_L$ as $V_{in}$ changes.

Figure 11:
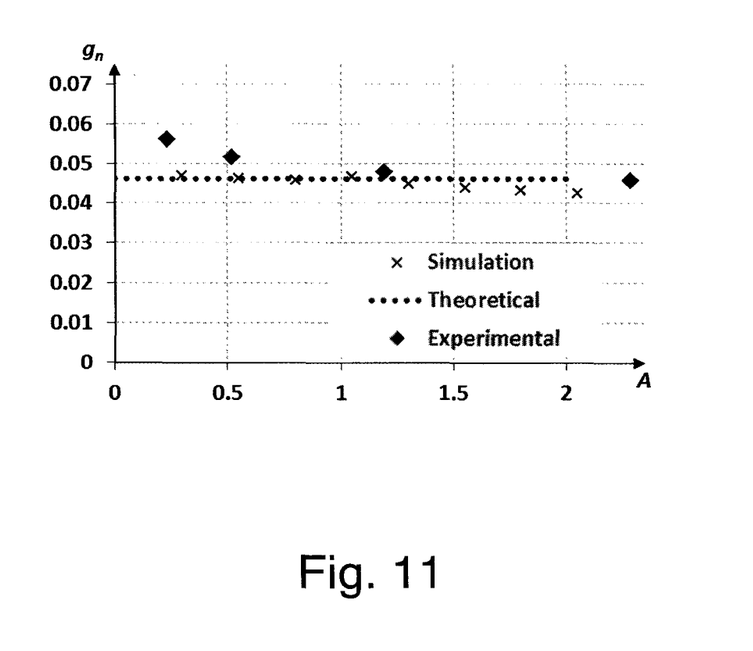
FIG. 11 schematically shows natural gyration ratio as a function of voltage gain A.

FIG. 11 schematically shows natural gyration ratio as a function of the voltage gain A and includes theoretical calculations, simulations and experimental results for evaluation. The deviation of the experimental results from the theoretical analysis at lower conversion ratios is primarily due to the higher conduction losses and consequently the lower efficiencies at these ratios as can be seen from FIG. 10. Another reason for the deviation is that the resonant characteristics of the three states were not identical and were not accounted for in the derivations for $g_n$. In particular, as can be observed from FIG. 9b, the discharge period (S2) is significantly longer than other states and will have a growing effect on $g_n$ for smaller values of A (larger step-down ratios).

In the type-B topology of FIG. 8, the power MOSFETs Q1 and Q3 were implemented by PMOS (such as IXTP96P085T of IXYS Corporation, Milpitas, Calif., U.S.A.) and Q2 and Q4 by NMOS (such as IXTP160N10T of IXYS Corporation, Milpitas, Calif., U.S.A.). Capacitive coupled driver circuitry was used to pass the control signals from a microcontroller (dsPIC33FJ502GS of Microchip Technology Inc., Chandler, Ariz., U.S.A.) to the MOSFETs that were untied from ground potential. Zero cross detection was done automatically, while the frequency adjustments to maintain the desired regulation was obtained manually. It should be pointed out that unlike in the case of converter A that is an open-loop operation with constant frequency ($f_n$), converter B was operated with manual frequency adjustments to achieve the desired voltage regulation.

Alternatively, the switching may be done by implementing an Isolated-Gate Bipolar Transistor (IGBT—which is a three-terminal power semiconductor device used as an electronic switch), or any other conventional switch.

Figure 12:
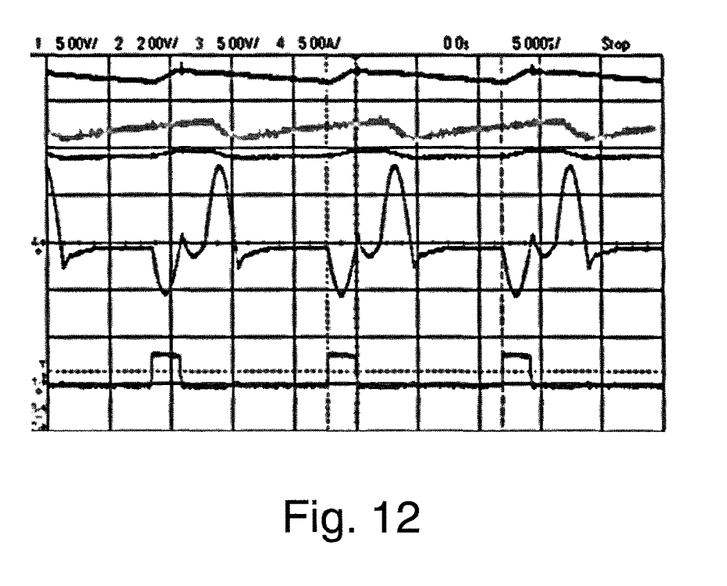
FIG. 12 schematically shows oscilloscope screenshot of a bridge gyrator converter.
Figure 13:
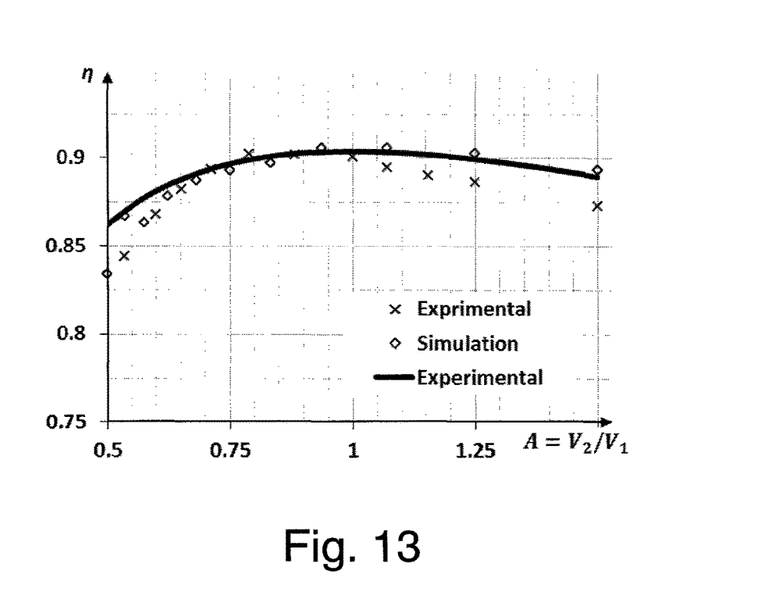
FIG. 13 schematically shows Efficiency graph for the bridge gyrator as a function of the voltage gain.

FIG. 12 schematically shows oscilloscope screenshot of a bridge gyrator converter, working at fs=70 kHz Vin=12V with Vo=15V, A=1.25, Po≈22 W, η=90%. Traces from top to bottom: $V_2$, $V_1$(math funct. 5V/div), ($V_1+V_2$), $I_C$, $Q_4$ gating signal. The order of the states is S3-discharge→S1-invert→S2-charge→delay. As one can see from the current waveform (second trace from the bottom), the converter is operated in a PDM mode; the switching frequency ($f_s$) is different from $f_n$, i.e. time-delay is introduced to obtain regulation. Efficiency evaluation of the converter for a range of voltage gains was carried out by changing the input voltage and compensating with the total time such that the output power and output voltage, 22 W and 12 V, respectively, were kept constant as shown in FIG. 13, which further illustrates the efficiency graph for the bridge gyrator as a function of the voltage gain. The theoretically calculated characteristics were found to be in very good agreement with the experimental and simulation results.

Figure 14:
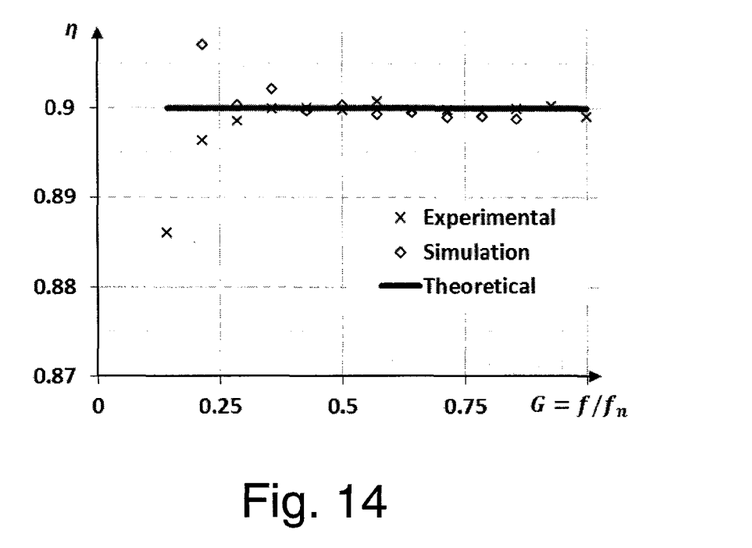
FIG. 14 schematically shows Efficiency for the bridge gyrator as a function of the regulation factor.

FIG. 14 presents the efficiency of the converter as a function of the regulation factor G. The theoretically predicted constant efficiency behavior is well validated by the simulation and experimental results for a wide operation range. Some mismatches at lower G-s can be explained by the fact that at longer periods (lower G), the output voltage ripple increases as implied from Eq. 16, that is, larger voltage differences are present, and hence higher peak (and RMS) currents are required to sustain the output voltage at the desired value, ultimately reducing the system efficiency.

Figure 15:
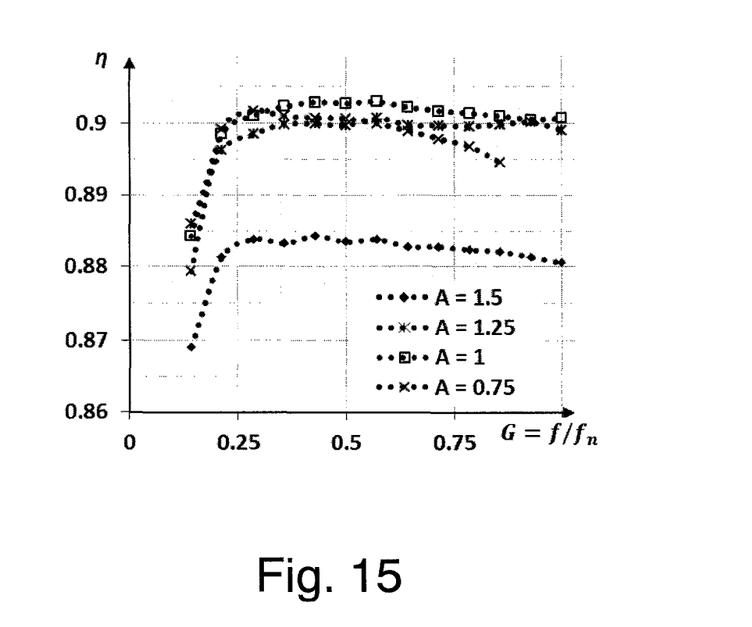
FIG. 15 schematically shows bridge gyrator efficiency as a function of the regulation factor, where the voltage gain is a parameter.

FIG. 15 summarizes the experimental traces of the converter efficiency for different power levels as a function of the control parameter G, for several conversion ratios (different traces), and supports the claim that efficiency of the converter is primarily affected by the conduction losses.

The converter proposed by the present invention demonstrates losses characteristics that are independent, to a large extent, of the voltage gain which is a unique feature among the switched capacitor based converters. This attribute resided thus far for switched-inductor converters, has been realized by resonant SCC technology. The proposed topology has a wide, continuous input to output voltage ratio (lower and higher than unity) without sacrificing the converter's efficiency. This is an advantage over the switched capacitor's technology that overcomes the dependency of the efficiency on the gain. Finally, the converter has a gyrator-like behavior, which is an advantage in current sourcing applications.

The losses of the converter proposed by the present invention are primarily due to conduction losses, which are affected by the loop resistances and RMS current in each sub-circuit. The gyration ratio can be considered constant for wide operation range, provided sufficiently high efficiency of the converter (85%). In cases of operation at lower efficiencies (extreme conversion ratios), the gyration ratio is expected to deviate from its constant value. Furthermore, for a given finite efficiency, the gyration factors ($g_n$ and $g_n^{-1}$) of Eq. 6 may hold different values. This deviation between the two values depends on the conversion type (step up or step down).

A method for voltage regulation that has been introduced employs time-delay between cycles of operation. By doing so, the amount of charge that is transferred to the output may be controlled. With the addition of control feature, the converter operation resembles to DCM-PFM of any switched inductor converter, and may be treated as such. The unique advantage of the new gyrator converter is that it has a wide operation range with high efficiency (a typical feature of SICs) and reduced volume (a typical feature of SCC).

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for increasing the efficiency of a resonant Switched Capacitor Converter (SCC) by eliminating the dependency between efficiency and conversion ratio, comprising:
   a) providing the resonant Switched Capacitor Converter (SCC), having an input and an output configured to be loaded by a load, said resonant SCC consisting of:
      a.1) an input connected to an input voltage source, from which power is delivered to said load;
      a.2) a resonant tank circuit formed by a capacitor connected in series with an inductor and defining a resonant cycle;
      a.3) a first switch connected in series between a first contact of said input voltage source and a first contact of said resonant tank circuit;
      a.4) a second switch connected in series between said first contact of said resonant tank circuit and a first contact of said load; and
      a.5) a conducting path connecting between a second contact of said input voltage source, a second contact of said resonant tank circuit and a second contact of said load;
   b) connecting a third switch connected in parallel to said resonant tank circuit, configured for introducing an alternative resonant path to said resonant tank circuit;
   c) during a first portion of said resonant cycle, charging said resonant tank circuit by controlling said first switch to start conducting at a first zero crossing point and allow current to flow from said input voltage source to said resonant tank circuit;
   d) during a second portion of said resonant cycle, following said first portion, discharging said resonant tank circuit into said load by controlling said first switch to stop conducting and said second switch to start conducting, at a second zero crossing point to thereby allow current to flow from said resonant tank circuit to said load;
   e) during a last portion of said cycle, following said second portion, reversing the voltage polarity on said capacitor by controlling said second switch to stop conducting and said third switch to start conducting at a third zero crossing point, to thereby balance residual charge of said capacitor and restore its voltage to return to its value at the beginning of said cycle; and
   f) repeating steps c) to e) above for each subsequent resonant cycle.

2. A method according to claim 1, wherein power flow is deliverable in the opposite direction from the output of the SCC to a load connected to the input of said SCC by controlling the switches to operate according to the following steps:
   a) during the first portion of said resonant cycle, charging said resonant tank circuit by controlling said second switch to start conducting at a fourth zero crossing point and allow current to flow from said output to said tank circuit;
   b) during the second portion of said resonant cycle, following said first portion, discharging said resonant tank circuit into said input by controlling said first switch to conduct and said second switch to stop conducting, at a fifth zero crossing point to thereby allow current to flow from said tank circuit to said load;
   c) during the last portion of said resonant cycle, following said second portion, reversing the polarity of the charge on said capacitor by controlling said first switch to stop conducting and said third switch to start conducting at a sixth zero crossing point; and
   d) repeating steps a) to c) above for each subsequent resonant cycle.

3. A method according to claim 1, wherein the switches are bidirectional switches that operate in a synchronous or complementary action.

4. A method according to claim 1, wherein power conversion performed by the SCC is a step-up and/or step-down conversion.

5. A method according to claim 1, wherein power conversion performed by the SCC is voltage dependent current-sourcing conversion, capable of accommodating input to output voltage gain being larger or smaller than unity.

6. A method according to claim 1, wherein the duration of each switching state is ½ the resonant cycle period and comprises three half resonant states.

7. A method according to claim 1, further comprising regulating the voltage at the output of the converter by performing one of the following:
   a) introducing time delay between switching states;
   b) using Pulse Density Modulation (PDM) by applying delay between consecutive sequences of resonant cycles; and
   c) creating packets using ON-OFF burst mode control.

8. A method according to claim 1, wherein energy from the input is transferred to the output in a controlled manner, in portions, where excess charge that is not transferred to the output is recycled in the SCC.

9. A method according to claim 1, wherein the SCC operates in a gyrator-mode power transfer, in which the dependency of average terminal currents from an average terminal voltages follows a gyrator relationship.

10. A method according to claim 9, wherein the SCC operates as a current sourcing DC-DC converter, whenever the SCC is loaded by a load resistor connected in parallel to a capacitor, such that the magnitude of the output voltage depends on the load resistor.

11. A method according to claim 1, wherein by controlling the switches to be either conducting, non-conducting, or replaced by a diode, the SCC operates in one of the following unidirectional or bidirectional conversion modes:
   a) Step up-down
   b) Step up
   c) Step down
   d) Doubler step up-down
   e) Doubler step up
   f) Doubler step down
   h) Divider step up
   i) Divider step down.

12. A method according to claim 1, wherein the SCC operates in a bridge configuration.

13. A method according to claim 10, wherein the SCC functions as a balancer/equalizer of energy cells or photovoltaic arrays.

14. A method according to claim 10, wherein the SCC operates in a bridge configuration, and the switches are implemented by MOSFETs, IGBTs or any other type of switch.

15. A resonant Switched Capacitor Converter (SCC) circuit that eliminates the dependency between efficiency and conversion ratio, comprising:
  a resonant Switched Capacitor Converter (SCC), having an input and an output configured to be loaded by a load, said resonant SCC consisting of:
    an input connected to an input voltage source, from which power is delivered to said load;
    a resonant tank circuit formed by a capacitor connected in series with an inductor and defining a resonant cycle;
    a first switch connected in series between a first contact of said input voltage source and a first contact of said resonant tank circuit;
    a second switch connected in series between said first contact of said resonant tank circuit and a first contact of said load; and
    a conducting path connecting between a second contact of said input voltage source, a second contact of said resonant tank circuit and a second contact of said load; and
  a third switch connected in parallel to said resonant tank circuit, configured for introducing an alternative resonant path to said resonant tank circuit,
wherein said circuit performs zero current switching and is adapted to:
  a) during a first portion of said resonant cycle, charge said resonant tank circuit by controlling said first switch to start conducting at a first zero crossing point and allow current to flow from said input voltage source to said resonant tank circuit;
  b) during a second portion of said resonant cycle, following said first portion, discharge said resonant tank circuit into said load by controlling said first switch to stop conducting and said second switch to start conducting, at a second zero crossing point to thereby allow current to flow from said resonant tank circuit to said load;
  c) during a last portion of said resonant cycle, following said second portion, reverse the voltage polarity on said capacitor by controlling said second switch to stop conducting and said third switch to start conducting at a third zero crossing point, to thereby balance residual charge of said capacitor and restore its voltage to return to its value at the beginning of said cycle; and
  d) repeat steps a) to c) above for each subsequent resonant cycle; and
wherein the circuit further comprises a control circuit, which is configured to deliver power in the opposite direction from the output of the SCC to a load connected to the input of said SCC, by controlling the switches to perform the following steps:
  e) during the first portion of said resonant cycle, charge said resonant tank circuit by controlling said second switch to start conducting at a fourth zero crossing point and allow current to flow from said output to said tank circuit;
  f) during the second portion of said resonant cycle, following said first portion discharge said resonant tank circuit into said input by controlling said first switch to conduct and said second switch to stop conducting, at a fifth zero crossing point to thereby allow current to flow from said tank circuit to said load;
  g) during the last portion of said resonant cycle, following said second portion, reverse the polarity of the charge on said capacitor by controlling said first switch to stop conducting and said third switch to start conducting at a sixth zero crossing point; and
  h) repeat steps e) to g) above for each subsequent resonant cycle.

16. A resonant SCC circuit according to claim 15, in which the switches are bidirectional switches that operate in a synchronous or complementary action.

17. A resonant SCC circuit according to claim 15, in which power conversion performed by the SCC is a step-up and/or step-down conversion.

18. A resonant SCC circuit according to claim 15, in which power conversion performed by the SCC is voltage dependent current-sourcing conversion, capable of accommodating input to output voltage gain being larger or smaller than unity.

19. A resonant SCC circuit according to claim 15, in which the duration of each switching state is ½ the resonant cycle period and comprises three half resonant states.

20. A resonant SCC circuit according to claim 15, further comprising circuitry for regulating the voltage at the output of the converter by performing one of the following:
  a) introducing time delay between switching states;
  b) using Pulse Density Modulation (PDM) by applying delay between consecutive sequences of resonant cycles; and
  c) creating packets using ON-OFF burst mode control.

21. A resonant SCC circuit according to claim 15, in which energy from the input is transferred to the output in a controlled manner, in portions, where excess charge that is not transferred to the output is recycled in the SCC.

22. A resonant SCC circuit according to claim 15, in which the SCC operates in a gyrator-mode power transfer, in which the dependency of average terminal currents from an average terminal voltages follows a gyrator relationship.

23. A resonant SCC circuit according to claim 22, in which the SCC operates as a current sourcing DC-DC converter, whenever the SCC is loaded by a load resistor connected in parallel to a capacitor, such that the magnitude of the output voltage depends on the load resistor.

24. A resonant SCC circuit according to claim 15, in which by controlling the switches to be either conducting, non-conducting, or replaced by a diode, the SCC operates in one of the following unidirectional or bidirectional conversion modes:
  a) Step up-down
  b) Step up
  c) Step down
  d) Doubler step up-down
  e) Doubler step up
  f) Doubler step down
  h) Divider step up
  i) Divider step down.

25. A resonant SCC circuit according to claim 15, in which the SCC operates in a bridge configuration.

26. A resonant SCC circuit according to claim 23, in which the SCC functions as a balancer/equalizer of energy cells or photovoltaic arrays.

27. Apparatus according to claim 23, in which the resonant SCC operates in a bridge configuration, and the switches are implemented by MOSFETs, IGBTs or any other type of switch.

* * * * *